United States Patent
Lee et al.

(10) Patent No.: US 7,388,640 B2
(45) Date of Patent: Jun. 17, 2008

(54) IN-PLANE SWITCHING MODE LIQUID CRYSTAL DEVICE WITH THE COMMON ELECTRODE AUXILIARY LINE NOT GENERATING AN ELECTRIC FIELD FOR DRIVING LIQUID CRYSTAL IN THE SUB-PIXEL REGIONS

(75) Inventors: Seung-Chul Lee, Gyeonggi-Do (KR); Ki-Bok Park, Gyeonggi-Do (KR); Won-Ho Lee, Gyeonggi-Do (KR); Sang-Ho Choi, Gyeonggi-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 279 days.

(21) Appl. No.: 10/960,539

(22) Filed: Oct. 8, 2004

(65) Prior Publication Data
US 2005/0078257 A1    Apr. 14, 2005

(30) Foreign Application Priority Data
Oct. 10, 2003  (KR) ...................... 10-2003-0070739

(51) Int. Cl.
*G02F 1/1343* (2006.01)
(52) U.S. Cl. ........................ 349/141; 349/123; 349/142
(58) Field of Classification Search ........................ None
See application file for complete search history.

(56) References Cited

U.S. PATENT DOCUMENTS

| | | | | |
|---|---|---|---|---|
| 5,598,285 A | * | 1/1997 | Kondo et al. ................ | 349/141 |
| 5,745,207 A | * | 4/1998 | Asada et al. ................ | 349/141 |
| 6,088,078 A | | 7/2000 | Kim et al. | |
| 6,452,657 B1 | | 9/2002 | Suzuki et al. | |
| 6,674,495 B1 | | 1/2004 | Hong et al. | |
| 2002/0033922 A1 | * | 3/2002 | Hidehira et al. ............. | 349/141 |
| 2004/0061824 A1 | * | 4/2004 | Ohta et al. .................. | 349/141 |

FOREIGN PATENT DOCUMENTS

| | | |
|---|---|---|
| CN | 1290922 A | 4/2001 |
| CN | 1388403 A | 1/2003 |

\* cited by examiner

*Primary Examiner*—David Nelms
*Assistant Examiner*—Lucy Chien
(74) *Attorney, Agent, or Firm*—McKenna Long & Aldridge LLP

(57) ABSTRACT

An in-plane switching mode LCD device includes a first substrate; one or more gate line on the first substrate; one or more data line crossing perpendicularly the one or more data line to define a pixel region; a common electrode module disposed in the pixel region; a pixel electrode module disposed in the pixel region, overlapping the common electrode module; a second substrate facing the first substrate; a first alignment film and a second alignment film disposed at facing surfaces of the first and second substrates, respectively; and a liquid crystal layer between the first alignment film and the second alignment film. The common electrode module includes a plurality of common electrodes and a plurality of protruded common electrodes. The pixel electrode module includes a plurality of pixel electrodes and a plurality of protruded pixel electrodes.

26 Claims, 18 Drawing Sheets

IN-PLANE SWITCHING MODE LIQUID CRYSTAL DEVICE WITH THE COMMON ELECTRODE AUXILIARY LINE NOT GENERATING AN ELECTRIC FIELD FOR DRIVING LIQUID CRYSTAL IN THE SUB-PIXEL REGIONS

The present invention claims the benefit of Korean Patent Application No. 10-2003-70739 filed in Korea on Oct. 10, 2003, which is hereby incorporated by reference.

BACKGROUND OF THE INVENTION

1. Field of the Invention

The present invention relates to a liquid crystal display device and, more particularly, to an in-plane switching mode liquid crystal display device and fabrication method thereof.

2. Description of the Related Art

Liquid crystal display devices are typically used because they consume low power and provide high picture quality. A liquid crystal display device is formed by attaching face to face a thin film transistor array substrate and a color filter substrate with a uniform interval therebetween, and disposing a liquid crystal layer between the thin film transistor array substrate and the color filter substrate.

Pixels are arranged on the thin film transistor array substrate in a matrix arrangement. A thin film transistor, a pixel electrode and a capacitor are formed within a pixel. A common electrode, an RGB color filter and a black matrix are formed on the color filter substrate. An electric field is applied between the common electrode and the pixel electrode to control the arrangement of the liquid crystal layer. The RGB color filter provides color display capabilities. An alignment film is formed at facing surfaces of the thin film transistor array substrate and the color filter substrate and is rubbed to orient the liquid crystal layer in a specified direction.

When an electric field is applied between the pixel electrode and the common electrodes, the liquid crystal rotates due to a dielectric anisotropy. As a result, light is transmitted or blocked by pixels to display a character or an image. However, such a twisted nematic mode liquid crystal display device has a narrow viewing angle. In-plane switching mode LCD arrangements have been recently introduced to improve the narrow viewing angle by aligning liquid crystal molecules in a substantially horizontal direction with respect to the substrate.

FIG. 1A depicts a plan view of an in-plane switching mode liquid crystal display (LCD) device in accordance with a related art arrangement. FIG. 1B illustrates a cross-sectional view of an in-plane switching mode liquid crystal display (LCD) device in accordance with a related art arrangement. As shown in FIG. 1A, gate lines 1 and data lines 3 are arranged horizontally and vertically on a first transparent substrate 10, defining pixel regions. Although in an actual liquid crystal display device, the 'N' number of gate lines 1 and the 'M' number of data lines 3 cross each other to create an N×M number of pixels. Only one pixel is shown in FIG. 1A for explanatory purposes.

A thin film transistor 9 is disposed at a crossing of the gate line 1 and the data line 3. The thin film transistor 9 includes a gate electrode 1a, a semiconductor layer 5 and source/drain electrodes 2a and 2b. The gate electrode 1a is connected to the gate line 1. The source/drain electrodes 2a and 2b are connected to the data line 3. A gate insulation film 8 is formed on the entire substrate.

A common line 4 is arranged parallel to the gate line 1 in the pixel region. A pair of electrodes, which are a common electrode 6 and a pixel electrode 7, are arranged parallel to the data line 3 for switching liquid crystal molecules. The common electrode 6 is simultaneously formed with the gate line 1 and connected to the common line 4. The pixel electrode 7 is simultaneously formed with the source/drain electrodes 2a and 2b and connected to the drain electrode 2b of the thin film transistor 9. A passivation film 11 is formed on the entire surface of the substrate 10 including the source/drain electrodes 2a and 2b. A pixel electrode line 14 is formed to overlap the common line 4 and is connected to the pixel electrode 7. The pixel electrode line 14, the common line 4, and the gate insulation film 8 interposed therebetween, form a storage capacitor (Cst).

A black matrix 21 and a color filter 23 are formed on a second substrate 20, on which an overcoat film is formed for flattening the color filter 23. The black matrix 21 prevents light leakage to the thin film transistor 9, the gate line 1 and the data line 3. The color filter 23 provides color display capabilities to the liquid crystal display device. Alignment films 12a and 12b are formed at facing surfaces of the first and second substrates 10 and 20. The alignment films 12a and 12b determine an initial alignment direction of the liquid crystal. A liquid crystal layer 13 is formed between the first and second substrates 10 and 20. The light transmittance of the liquid crystal layer 13 is controlled by a voltage applied between the common electrode 6 and the pixel electrode 7.

FIG. 2A illustrates the orientation of a liquid crystal molecule in accordance with the related art in-plane switching mode LCD device when no voltage is applied to the LCD device. Referring to FIG. 2A, when no voltage is applied between the common electrode 6 and the pixel electrode 7 of the in-plane switching mode LCD device, a liquid crystal molecule in the liquid crystal layer is arranged along a rubbing direction (the direction indicated by arrow ↑ in the drawing) of the alignment film formed at the facing surfaces of the first and second substrates.

FIG. 2B illustrates the orientation of a liquid crystal molecule in accordance with the related art in-plane switching mode LCD device when a voltage is applied to the LCD device. Referring to FIG. 2B, when a voltage is applied between the common electrode 6 and the pixel electrode 7, an electric field is generated between electrodes 6 and 7, and the liquid crystal molecule transmits light according to the generated electric field.

FIG. 3 is a graph showing variations of the light transmittance characteristics of the related art in-plane switching mode LCD device. As shown in FIG. 3, the light transmittance increases linearly with the voltage applied between the common electrode 6 and the pixel electrode 7. However, if the voltage increases continuously beyond a maximum value, the light transmittance starts to decrease in a parabolic shape. In this case, the voltage Vmax corresponding to a maximum transmittance is obtained when the liquid crystal molecule makes a 45° angle with respect to the initial alignment direction of the alignment film. Moreover, the transmittance of the liquid crystal material is reduced if a voltage higher than Vmax is applied between the common electrode 6 and the pixel electrode 7.

However, the graph in FIG. 3 only depicts theoretical transmittance. In an actual related art LCD device, the maximum luminance is reached at a voltage lower than the theoretical value Vmax. Thus, luminance is degraded by the application of the theoretical value Vmax to an actual product. Thus, in the actual related art LCD device, the maximum value of the applied voltage is set lower than the theoretical Vmax. Accordingly, maximum luminance of the product cannot generally be reached.

The in-plane switching mode LCD device suffers from the following problems. Liquid crystal molecules in the liquid crystal layer 13 are always oriented on the same plane, thereby reducing a grey level in the vertical and horizontal viewing angle directions. Although the viewing angle can be enhanced, the transmittance at a voltage higher than Vmax is degraded. In addition, although a voltage Vmax needs be applied to achieve the brightest possible image, picture quality is impacted by the collective arrangement of liquid crystal molecules in one direction. For example, a yellow shift appears when a screen image is viewed in the direction of the shorter side of the liquid crystal molecules. A blue shift occurs when the screen image is viewed in the direction of the longer side of the liquid crystal molecules.

SUMMARY OF THE INVENTION

Accordingly, the present invention is directed to an in-plane switching mode liquid crystal display device and fabrication method thereof that substantially obviates one or more of the problems due to limitations and disadvantages of the related art.

An object of the present invention is to provide an in-plane switching mode liquid crystal display (LCD) device with improved transmittance at high voltages.

Another object of the present invention is to provide an in-plane switching mode liquid crystal display (LCD) device with improved transmittance at high voltages.

Another object of the present invention is to provide a method of fabricating an in-plane switching mode liquid crystal display (LCD) device with improved transmittance at high voltages.

Another object of the present invention is to provide an in-plane switching mode liquid crystal display (LCD) device with reduced color shift in relation to a viewing angle.

Another object of the present invention is to provide a method of fabricating an in-plane switching mode liquid crystal display (LCD) device with reduced color shift in relation to a viewing angle.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the in-plane switching mode LCD device includes a first substrate; one or more gate line arranged in a first direction on the first substrate; one or more data line arranged in a second direction perpendicular to the first direction on the first substrate, a crossing of the one or more data line with the one or more gate line defining a pixel region; a common electrode module disposed in the pixel region; a pixel electrode module disposed in the pixel region, overlapping the common electrode module; a second substrate facing the first substrate; a first alignment film and a second alignment film disposed at facing surfaces of the first and second substrates, respectively; and a liquid crystal layer between the first alignment film and the second alignment film. The common electrode module includes a plurality of common electrodes arranged parallel to the one or more gate line and a plurality of protruded common electrodes protruding from one or more of the plurality of common electrodes. The pixel electrode module includes a plurality of pixel electrodes arranged parallel to the one or more data line and a plurality of protruded pixel electrodes protruding from one or more of the plurality of pixel electrodes.

In another aspect, the in-plane switching mode LCD device includes a first substrate; one or more gate line arranged in a first direction on the first substrate; one or more data line arranged in a second direction perpendicular to the first direction on the first substrate, a crossing of the one or more data line with the one or more gate line defining a pixel region; a plurality of common electrodes disposed in the pixel region; a plurality of pixel electrodes disposed in the pixel region, overlapping the common electrodes; a plurality of first protruded electrodes protruding from one or more of the plurality of common electrodes; a plurality of second protruded electrodes protruding from one or more of the plurality of pixel electrodes; a second substrate facing the first substrate; a first alignment film and a second alignment film disposed at facing surfaces of the first and second substrates, respectively; and a liquid crystal layer between the first alignment film and the second alignment film.

In another aspect, the method for fabricating an in-plane switching mode LCD device includes providing a first substrate and a second substrate facing each other; forming one or more horizontal gate line on the first substrate; forming one or more vertical data line on the first substrate, a crossing of the one or more data line with the one or more gate line defining a pixel region; forming a plurality of common electrodes in the pixel region, parallel to the one or more gate line; forming a plurality of pixel electrodes in the pixel region and parallel to the one or more data line, the plurality of pixel electrodes overlapping and crossing the plurality of common electrodes to define a plurality of sub-pixel regions; forming a plurality of first protruded electrodes protruding from one or more of the plurality of common electrodes; forming a plurality of second protruded electrodes protruding from one or more of the plurality of pixel electrodes; forming a first alignment film and a second alignment film at facing surfaces of the first and second substrates, respectively; and forming a liquid crystal layer between the first alignment film and the second alignment film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 4A:
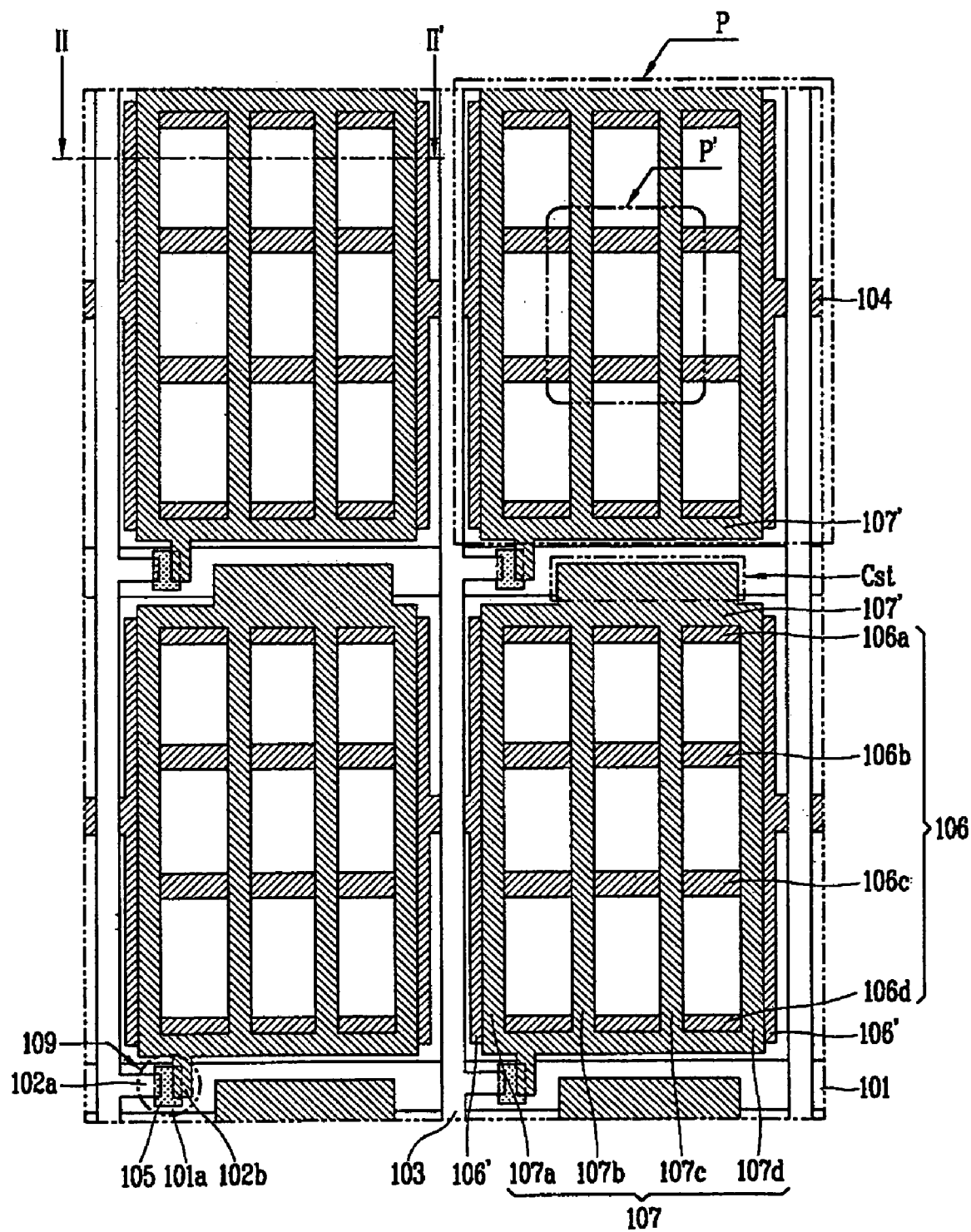
FIG. 4A depicts a plan view of an exemplary in-plane switching mode liquid crystal display (LCD) device in accordance with an embodiment of the present invention.

FIG. 4A depicts a plan view of an exemplary in-plane switching mode liquid crystal display (LCD) device in accordance with an embodiment of the present invention. Referring to FIG. 4A, the in-plane switching mode LCD device 100 includes gate lines 101 and data lines 103. The gate lines 101 and the data lines 103 are arranged on a transparent first substrate 110 horizontally and vertically, respectively. A crossing of a gate line 101 and a data line 103 defines a pixel (P). A switching device 109 is disposed at a crossing of a gate line 101 and a data line 103. The switching device 109 includes a gate electrode 101a, a semiconductor layer 105 and source/drain electrodes 102a and 102b. The gate electrode 101a extends from the gate line 101. The semiconductor layer 105 is formed on the gate electrode 101a. The source/drain electrodes 102a and 102b are disposed on the semiconductor layer 105 with an interval therebetween.

The pixel (P) is divided into a plurality of sub-pixels (P') by a first electrode module 106 and a second electrode module 107 arranged horizontally and vertically, respectively, in the pixel region (P). The first electrode module 106, which is a common electrode module, includes first to fourth common electrodes 106a-106d. The second electrode module 107, which is a pixel electrode module, includes first to fourth pixel electrodes 107a-107d. The first to fourth common electrodes 106a-106d are arranged parallel to the gate line 101. The first to fourth pixel electrodes 107a-107d are arranged parallel to the data line 103. Crossings of the first to fourth common electrodes with the first to fourth pixel electrodes form a plurality of sub-pixels (P'). Though not shown, the first electrode module 106 can be formed parallel to the data line 103 and the second electrode module 107 can be formed parallel to the gate line 101.

A common electrode auxiliary line 106' is formed parallel to the data line 103 at an outer edge of the pixel (P) and overlapped by the first and fourth pixel electrodes 107a and 107d. The common electrode auxiliary line 106' electrically connects the first to fourth common electrodes 106a-106d. The common electrode auxiliary line 106' does not generate an electric field for driving the liquid crystal in the sub-pixels (P') but shields the first to fourth pixel electrodes 107a-107d from the influence of signals on the data line 103. The common electrode auxiliary line 106' can be disposed closer to the data line 103 than to the first to fourth pixel electrodes 107a-107d, thereby to more effectively shield signals carried on the data line 103.

Still referring to FIG. 4A, a common electrode connection pattern 104 is formed to electrically connect neighboring common electrode auxiliary lines 106'. The common electrode connection pattern 104 can be formed at any position of the common electrode auxiliary line 106'. The common electrode connection pattern 104 preferably formed at a central portion of the common electrode auxiliary line 106' to raise a speed of transferring a signal to the common electrode module 106.

A pixel electrode auxiliary line 107' is formed at an outer edge of the pixel (P). The pixel electrode auxiliary line 107' is parallel to the gate line 101. The pixel electrode auxiliary line 107' electrically connects the first to fourth pixel electrodes 107a-107d. An upper pixel electrode auxiliary line 107' is positioned at an upper end of the pixel. The upper pixel electrode auxiliary line 107' and an overlapped portion of the gate line 101 at an upper end of the pixel form a storage capacitor (Cst). A lower pixel electrode auxiliary line 107' is positioned at a lower end of the pixel. The lower pixel electrode auxiliary line 107' is electrically connected to the drain electrode 102b of the switching device 109.

The first to fourth common electrodes 106a-106d and the pixel electrode auxiliary line 107' or the first to fourth pixel electrodes 107a-107d and the common electrode auxiliary line 106' can form a different storage capacitor by overlapping with each other at a certain interval. A storage capacitor can be formed at a region where the common electrode module 106 and the pixel electrode module 107 cross and overlap each other. Accordingly, the capacitance of the storage capacitor can be increased.

Figure 4B:
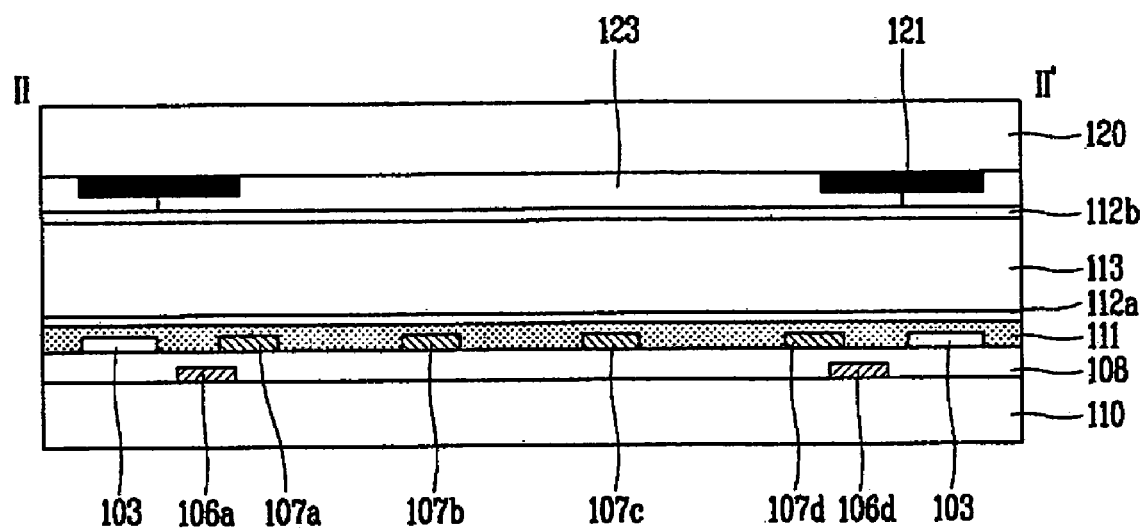
FIG. 4B illustrates a cross-sectional view of an exemplary in-plane switching mode liquid crystal display (LCD) device in accordance with an embodiment of the present invention.

FIG. 4B illustrates a cross-sectional view of an exemplary in-plane switching mode liquid crystal display (LCD) device in accordance with an embodiment of the present invention. Referring to FIG. 4B, the common electrode module 106 and the pixel electrode module 107 are electrically insulated by a gate insulation film 108 interposed therebetween. A passivation film 111 is formed on the entire surface of the substrate including the pixel electrode module 107.

A black matrix 121 and a color filter 123 are formed on the second substrate 120. The black matrix 121 prevents leakage of light from the liquid crystal display. The color filter 123 implements color for the liquid crystal display. First and second alignment films 112a and 112b are formed at facing surfaces of the first and second substrates 110 and 120. The first and second alignment films 112a and 112b determine the initial alignment direction of liquid crystal. A liquid crystal layer 113 is interposed between the first and second alignment films 112a and 112b.

Figure 5A:
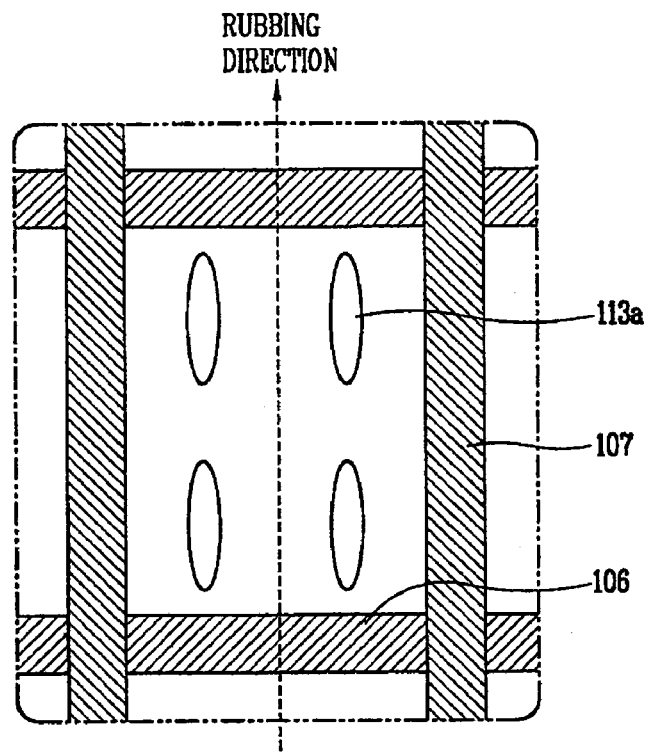
FIG. 5A illustrates the orientation of liquid crystal molecules when no voltage is applied to an exemplary in-plane switching mode liquid crystal display (LCD) device in accordance with an embodiment of the present invention.

In an in-plane switching mode LCD device according to embodiments of the present invention, light transmittance is controlled by driving liquid crystal molecules in accordance with the strength of a voltage applied between the common electrode module 106 and the pixel electrode module 107. FIG. 5A illustrates the orientation of liquid crystal molecules when no voltage is applied to an exemplary in-plane switching mode liquid crystal display (LCD) device in accordance with an embodiment of the present invention. Referring to FIG. 5A, when no voltage is applied between the common electrode module 106 and the pixel electrode module 107, the liquid crystal molecules 113a are oriented in the rubbing direction (the direction indicated by arrow ↑) of the alignment film formed at the facing surfaces of the first and second substrates 110 and 120. As depicted in FIG. 5A, the rubbing direction of the alignment film is parallel to the direction of the pixel electrode module 107. In this case, the liquid crystal molecules 113a are oriented parallel to the direction of the pixel electrode module 107, thereby displaying black on the screen. Alternatively, the rubbing direction can be parallel to the direction of the common electrode module 106. In this alternate case, the liquid crystal is oriented parallel to the direction of the common electrode module 106.

Figure 5B:
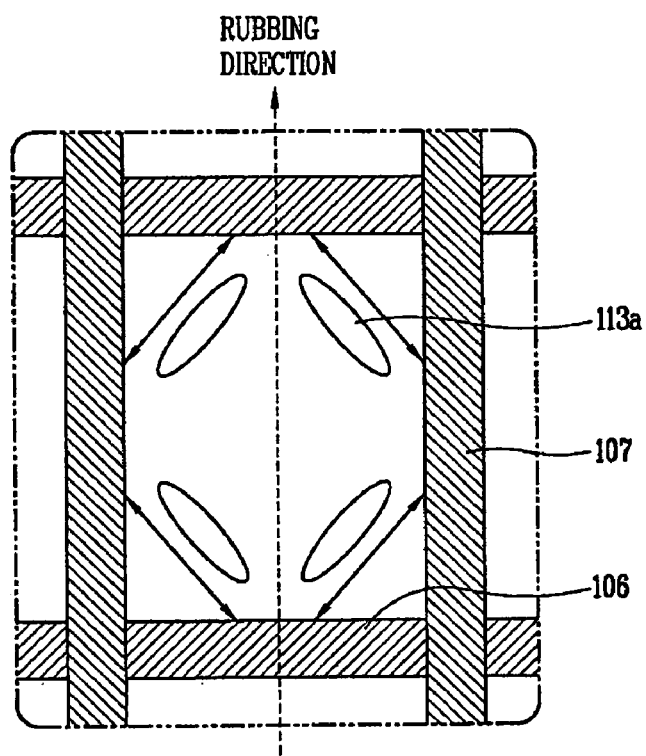
FIG. 5B illustrates the orientation of liquid crystal molecules when a voltage is applied to an exemplary in-plane switching mode liquid crystal display (LCD) device in accordance with an embodiment of the present invention.

FIG. 5B illustrates the orientation of liquid crystal molecules when a voltage is applied to an exemplary in-plane switching mode liquid crystal display (LCD) device in accordance with an embodiment of the present invention. Referring to FIG. 5B, when a voltage is applied between the common electrode module 106 and the pixel electrode module 107, an electric field is generated therebetween. The liquid crystal molecules 113a are driven by the electric field generated by the voltage applied between the common electrode and the pixel electrode. As discussed above, the common electrode module 106 crosses perpendicularly the pixel electrode module 107 to form the sub-pixel P'. When the voltage is applied across the common electrode module 106 and the pixel electrode module 107, the electric field generated in the sub-pixel P' is diagonally oriented at corner portions of the sub-pixel P' and is symmetrical about the center of the sub-pixel P', as depicted in FIG. 5B.

Figure 1A:
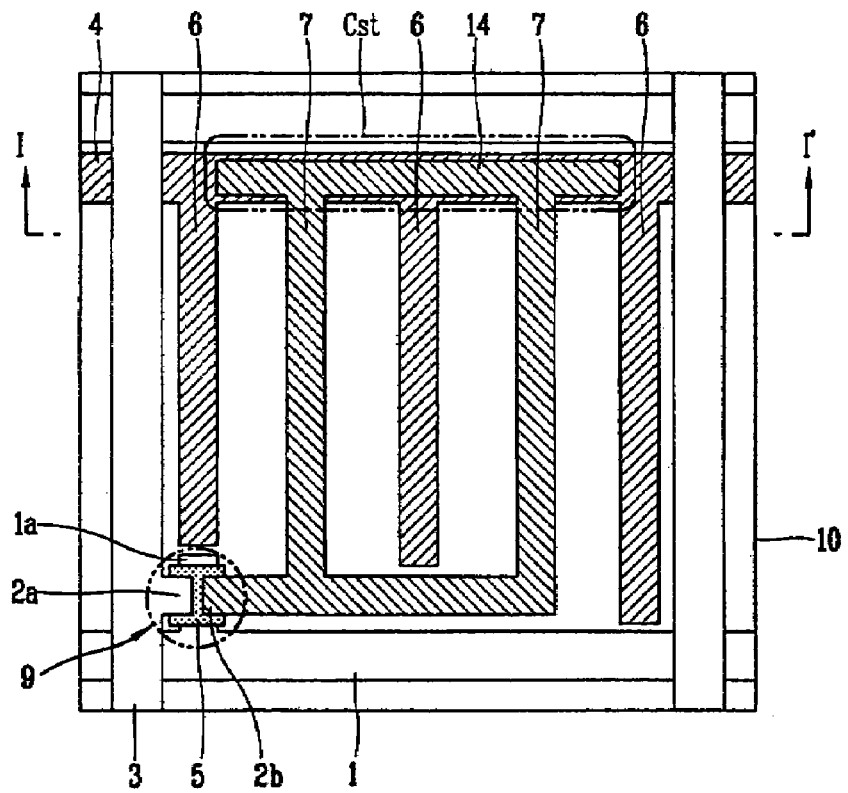
FIG. 1A depicts a plan view of an in-plane switching mode liquid crystal display (LCD) device in accordance with a related art arrangement.
Figure 1B:
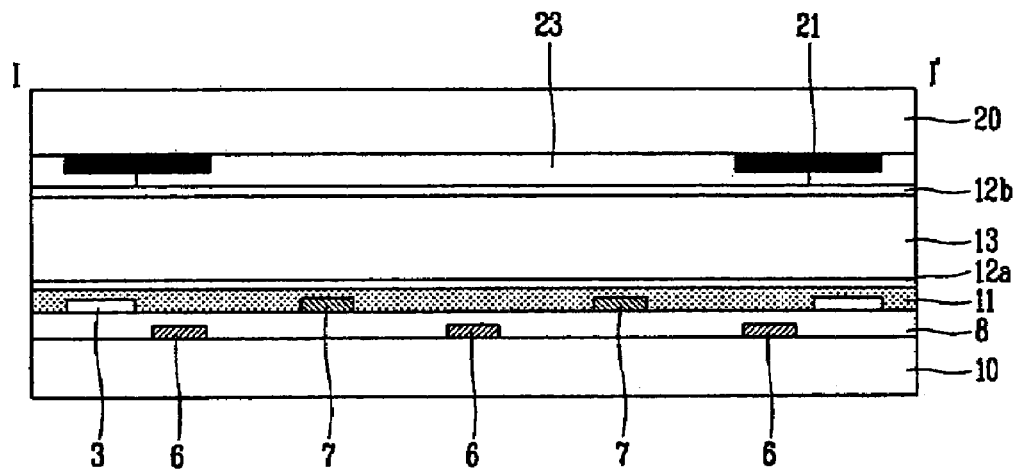
FIG. 1B illustrates a cross-sectional view of an in-plane switching mode liquid crystal display (LCD) device in accordance with a related art arrangement.
Figure 2A:
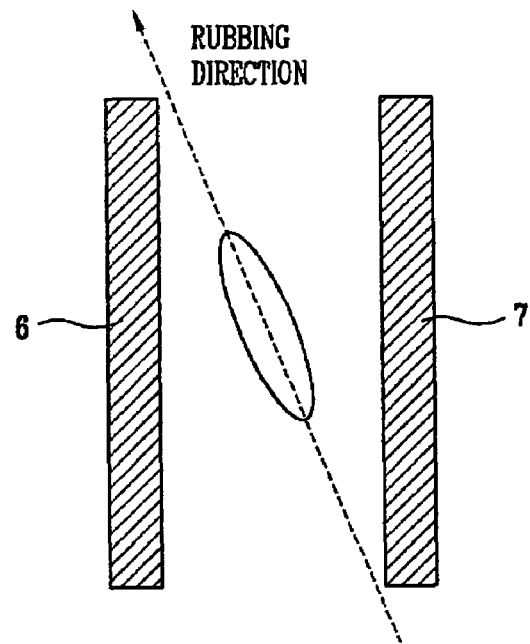
FIG. 2A illustrates the orientation of a liquid crystal molecule in accordance with the related art in-plane switching mode LCD device when no voltage is applied to the LCD device.
Figure 2B:
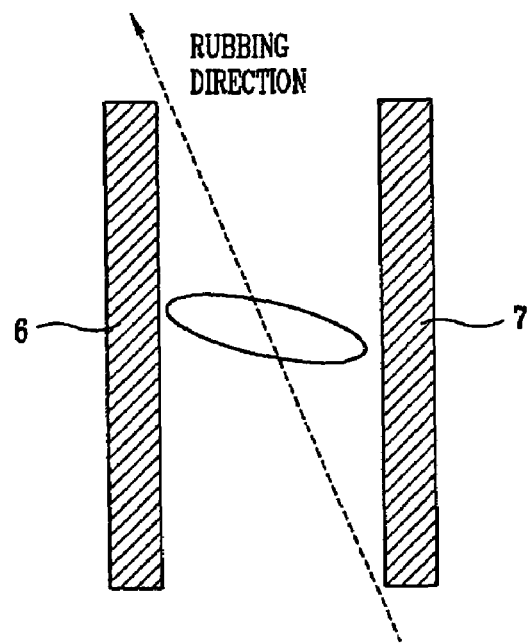
FIG. 2B illustrates the orientation of a liquid crystal molecule in accordance with the related art in-plane switching mode LCD device when a voltage is applied to the LCD device.
Figure 3:
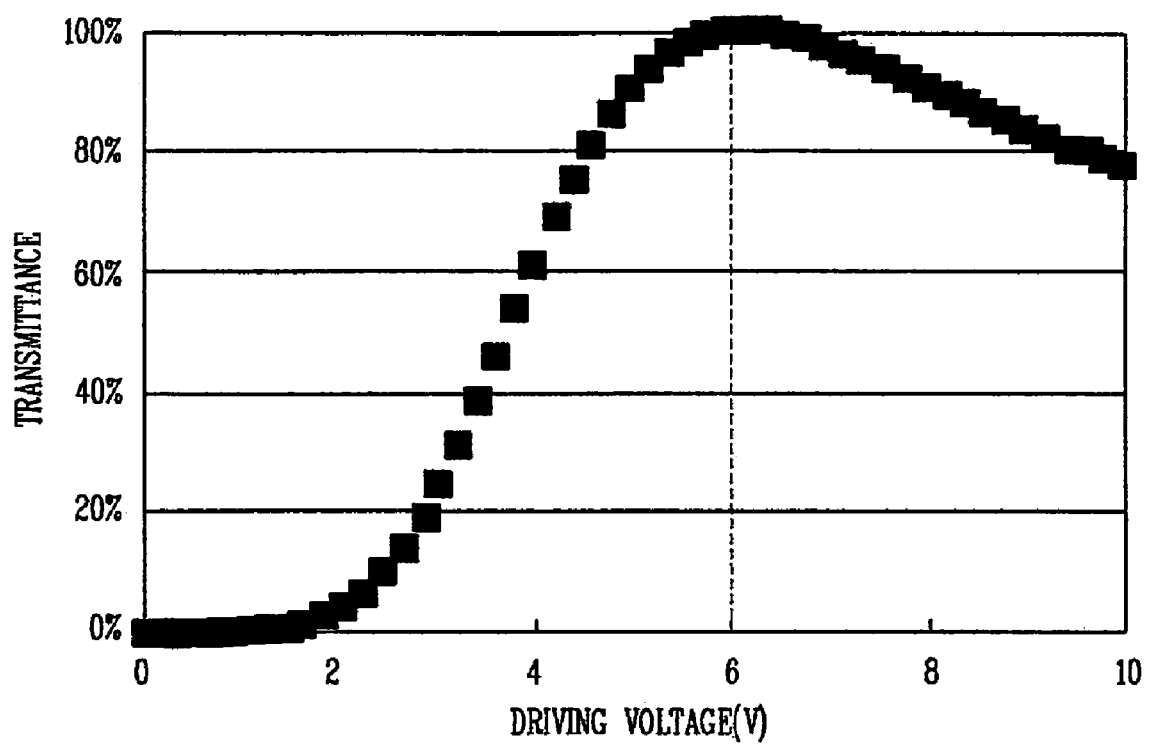
FIG. 3 is a graph showing variations of the light transmittance characteristics of the related art in-plane switching mode LCD device.
Figure 6:
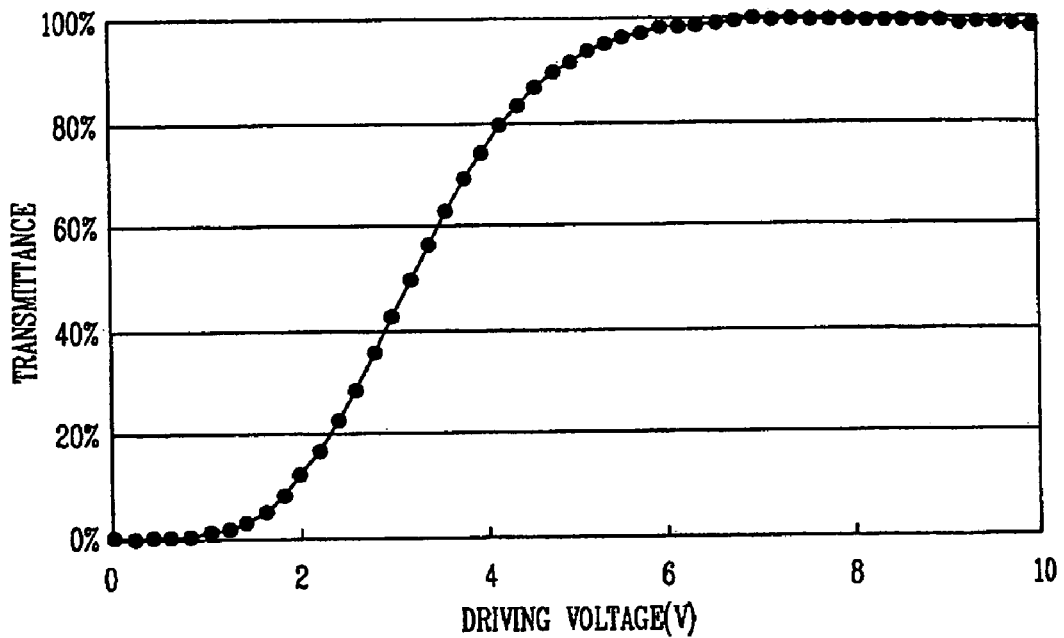
FIG. 6 is a graph showing variations of light transmittance characteristics of an exemplary in-plane switching mode LCD device in accordance with an embodiment of the present invention.

FIG. 6 is a graph showing variations of light transmittance characteristics of an exemplary in-plane switching mode LCD device in accordance with an embodiment of the present invention. As shown in FIG. 6, when no voltage is applied, light transmittance is 0. Light transmittance increases almost linearly with the strength of the applied voltage. When the voltage reaches a certain level, which corresponds to a maximum transmittance, light transmittance is not further increased even if the applied voltage is further increased. When the voltage increases further, the transmittance remains at the maximum value rather than decreasing, in contrast with as the related art behavior depicted in FIG. 3. The initial voltage at which the maximum transmittance is reached is defined as Vmax.

The exemplary light transmittance characteristic curve depicted in FIG. 6 is due to the structural characteristics of the common electrode and the pixel electrode, in accordance with embodiments of the present invention. In general, the light transmittance (T) can be calculated by Equation 1. In Equation 1, α is an angle between a polarization plate and an optical axis of liquid crystal molecules, 'd' is a cell gap of the liquid crystal display, and λ is a wavelength of light. According to Equation 1, if the polarization plate and the rubbing direction have the same direction, the light transmittance is maximized when the angle between the polarization plate and the optical axis of the liquid crystal molecules is 45°.

$$\text{light transmittance}(T) = \sin^2(2\alpha)\sin^2(\pi d\Delta n(\lambda)/\lambda) \quad \text{Equation 1}$$

Figure 7:
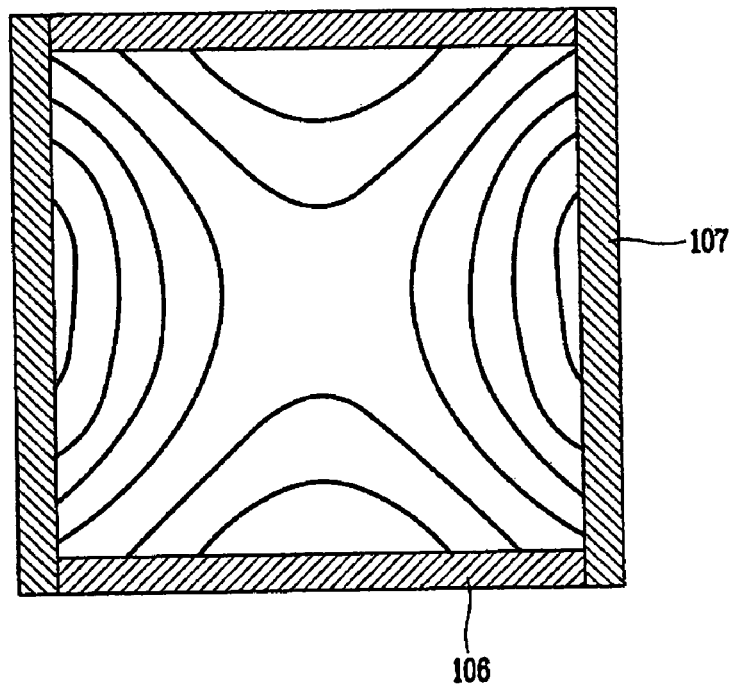
FIG. 7 shows an exemplary equipotential line in a sub-pixel region in accordance with an embodiment of the present invention.

FIG. 7 shows an exemplary equipotential line in a sub-pixel region in accordance with an embodiment of the present invention. As shown in FIG. 7, the direction of the electric field formed between the common electrode and the pixel electrode does not exceed 45°. Accordingly, although the applied voltage may be higher than Vmax, light transmittance is not reduced because the orientation of the liquid crystal molecules 113a does not exceed 45° with respect to the rubbing direction.

Figure 8A:
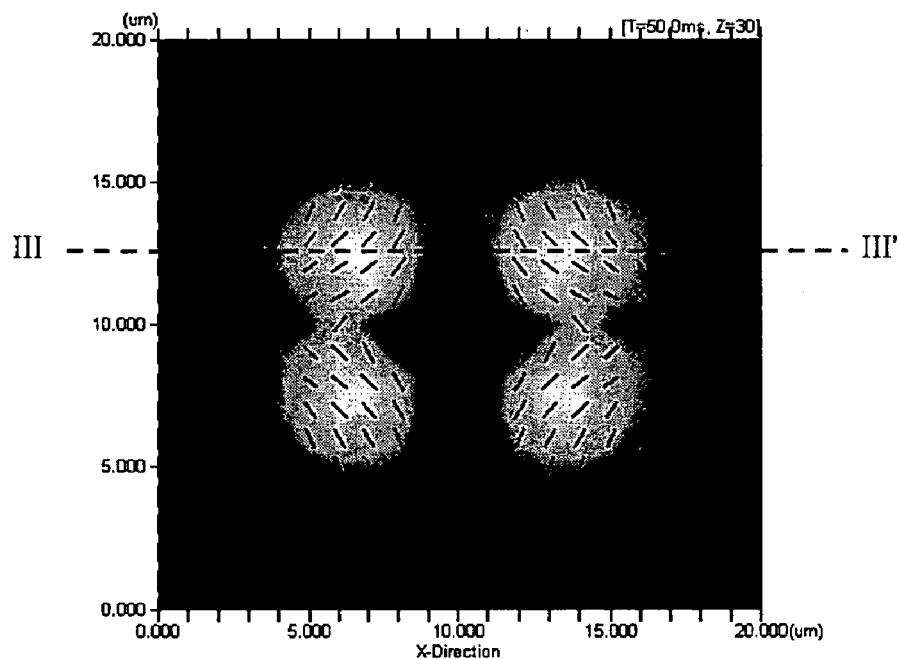
FIG. 8A is a planar view of orientations of liquid crystal molecules and front surface transmittance characteristics within a sub-pixel region in an exemplary in-plane switching mode LCD device in accordance with an embodiment of the present invention.
Figure 8B:
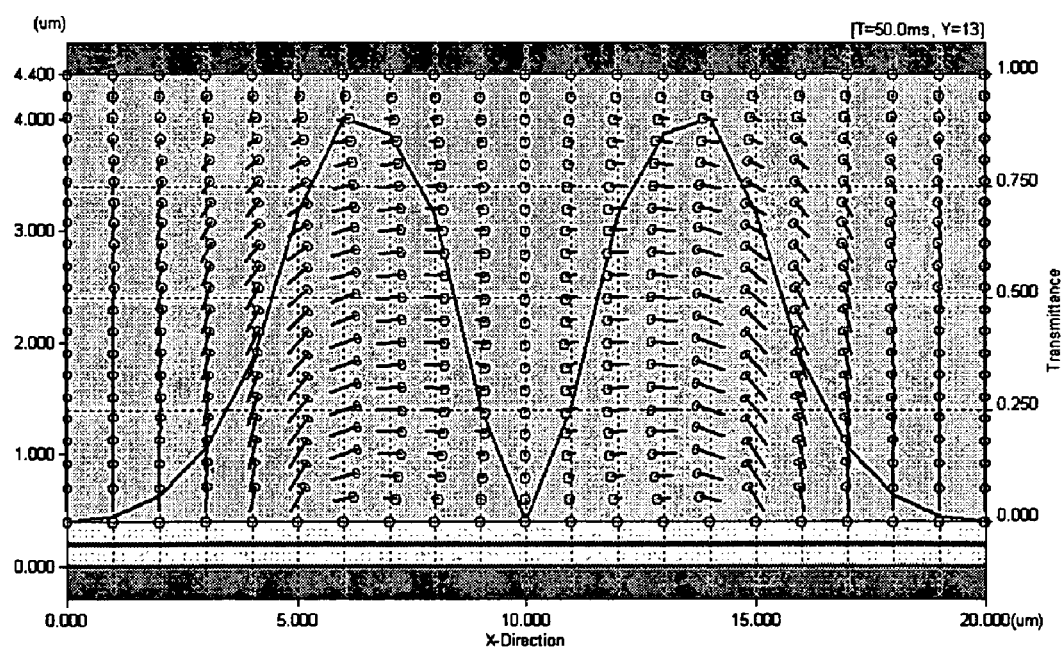
FIG. 8B is a cross-sectional view of the orientations of liquid crystal molecules and transmittance characteristics along line III-III in the exemplary in-plane switching mode LCD device depicted in FIG. 8A.

FIG. 8A is a planar view of orientations of liquid crystal molecules and front surface transmittance characteristics within a sub-pixel region in an exemplary in-plane switching mode LCD device in accordance with an embodiment of the present invention. FIG. 8B is a cross-sectional view of the orientations of liquid crystal molecules and transmittance characteristics along line III-III in the exemplary in-plane switching mode LCD device depicted in FIG. 8A. Referring to FIG. 8A, when a voltage Vmax is applied across the common electrode and the pixel electrode, liquid crystal molecules (indicated by a bar shape) are arranged parallel to the field generated between the common electrode and the pixel electrode, and transmit light. Then, a boundary is formed between regions having different states of arrangement of the liquid crystal molecules. The boundary is roughly shaped like a cross (+). The boundary divides one sub-pixel into four domains. Liquid crystal molecules have the same orientation in a diagonal direction. The orientations of liquid crystal molecules are symmetrical about the boundary. In accordance with this embodiment of the present invention, maximum light transmittance is achieved by driving the liquid crystal within the four domains defined by the boundary.

Figure 9:
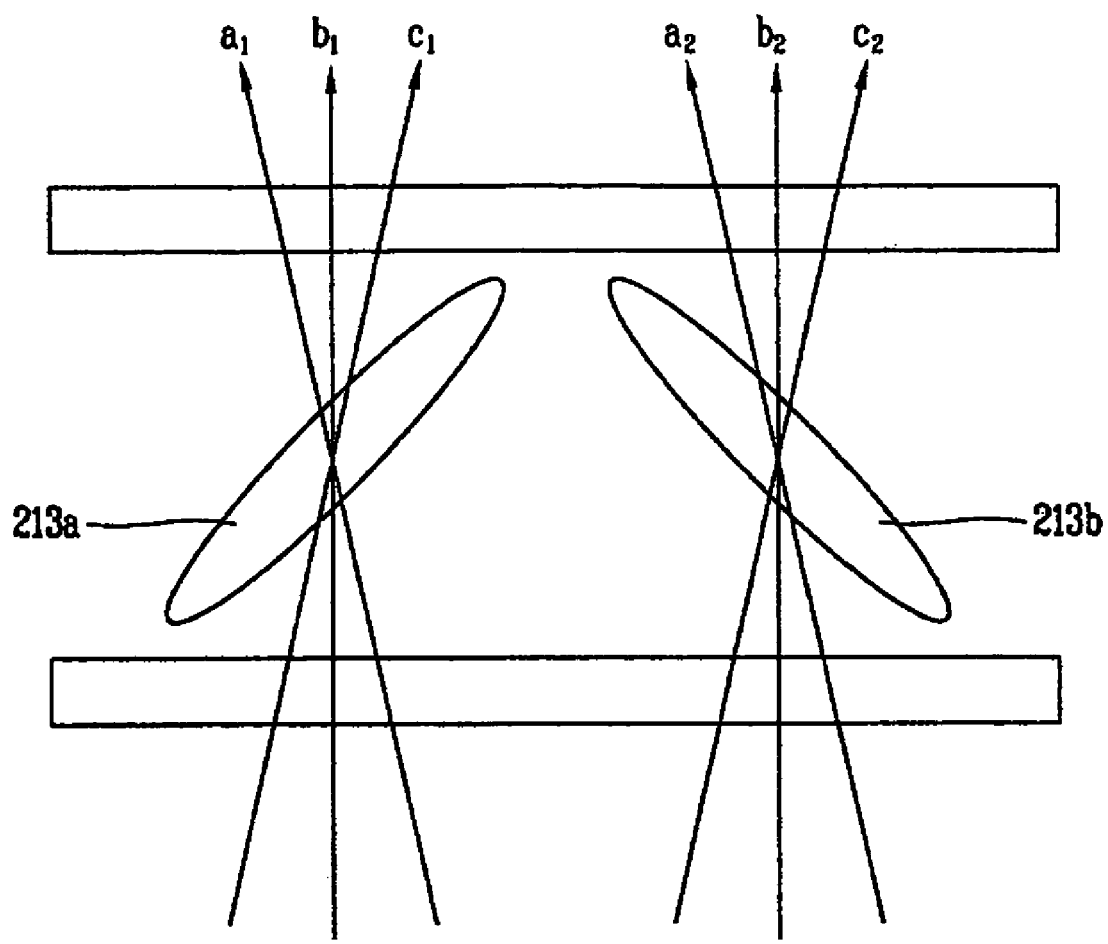
FIG. 9 illustrates a birefringence compensation in an exemplary in-plane switching mode LCD device in accordance with an embodiment of the present invention.

FIG. 9 illustrates a birefringence compensation in an exemplary in-plane switching mode LCD device in accordance with an embodiment of the present invention. As shown in FIG. 9, when liquid crystal molecules are symmetrically oriented in two domains, a birefringence a1 of a first liquid crystal molecule 213a compensates a birefringence a2 of a second liquid crystal molecule 213b oriented in a direction opposite to the first liquid crystal molecule 213a, thereby canceling birefringence. Similarly, a birefringence value c1 is compensated by c2. Accordingly, color shift due to the birefringence characteristics of the liquid crystal is minimized. Thus, degradation of image quality according to viewing angle can be prevented. Thus, the symmetrical multi-domain structure compensates aberrations caused by a birefringence of the liquid crystal and minimizes color shift.

Figure 10A:
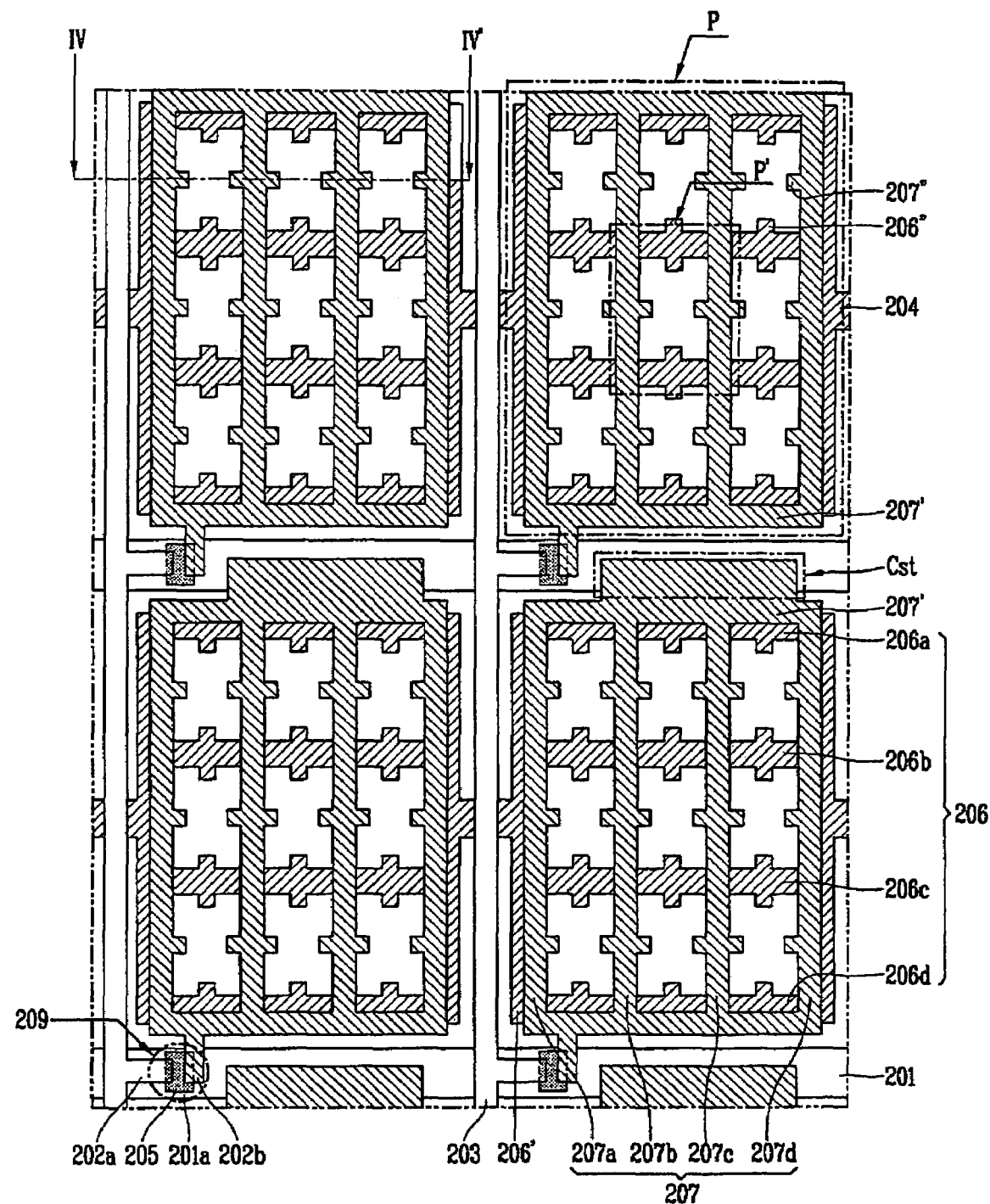
FIG. 10A is a planar view of an exemplary in-plane switching mode liquid crystal display (LCD) device in accordance with another embodiment of the present invention.
Figure 10B:
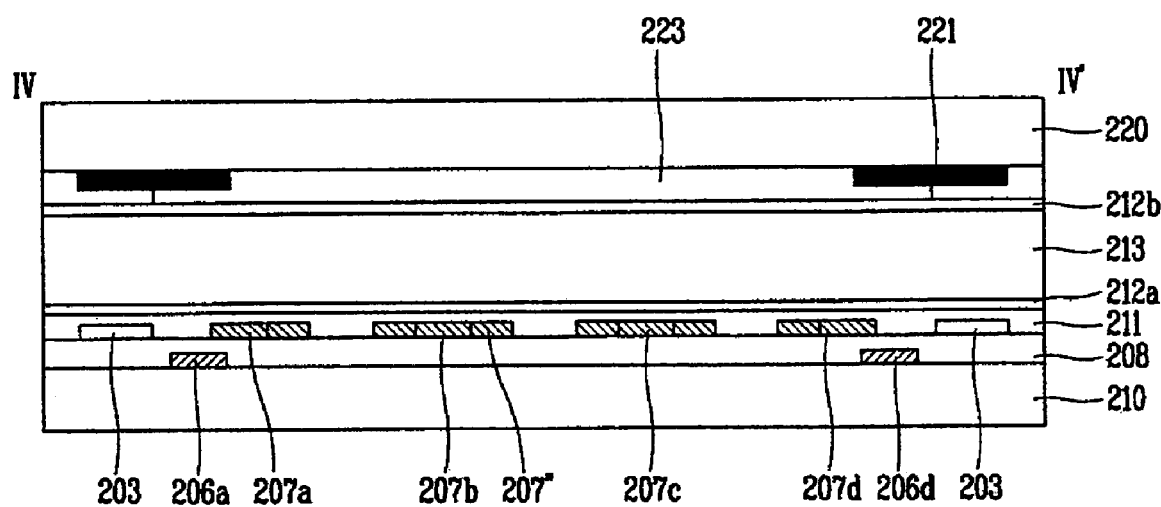
FIG. 10B is a cross-sectional view of an exemplary in-plane switching mode liquid crystal display (LCD) device in accordance with another embodiment of the present invention.

FIG. 10A is a planar view of an exemplary in-plane switching mode liquid crystal display (LCD) device in accordance with another embodiment of the present invention. FIG. 10B is a cross-sectional view of an exemplary in-plane switching mode liquid crystal display (LCD) device in accordance with this embodiment of the present invention. In accordance with this embodiment of the present invention, in the in-plane switching mode LCD device depicted in FIGS. 10A and 10B, a central portion of a sub-pixel region, within which liquid crystal molecules are abnormally driven, is reduced to enhance luminance of the LCD device.

As shown in FIGS. 10A and 10B, gate lines 201 and data lines 203 are respectively arranged horizontally and vertically on a transparent first substrate 210. A crossing of a gate line 201 and a data line 203 defines a pixel (P). A switching device 209 is disposed at each crossing of the gate line 201 and the data line 203. The switching device 209 includes a gate electrode 201a, a semiconductor layer 205, and source/drain electrodes 202a and 202b. The gate electrode 201a extends from the gate line 201. The semiconductor layer 205 is formed on the gate electrode 201a. The source/drain electrodes 202a and 202b are disposed on the semiconductor layer 205 with an interval therebetween.

The pixel region (P) is divided into a plurality of sub-pixels (P') by first and second electrodes modules 206 and 207 arranged horizontally and vertically in the pixel region (P). The first electrode module 206, which is a common electrode module, includes first to fourth common electrodes 206a-206d. The second electrode module 207, which is a pixel electrode module, includes first to fourth pixel electrodes 207a-207d. The first to fourth common electrodes 206a-206d are arranged parallel to the gate line 201. The first to fourth pixel electrodes 207a-207d are arranged parallel to the data line 203. Crossings of the first to fourth common electrodes with the first to fourth pixel electrodes form a plurality of sub-pixels (P'). Though not shown, the first electrode module 206 can be formed parallel to the data line 203 and the second electrode module 207 can be formed parallel to the gate line 201.

A common electrode auxiliary line 206' is formed parallel to the data line 203 at an outer edge of the pixel (P) and overlaps the first and fourth pixel electrodes 207a and 207d. The common electrode auxiliary line 206' electrically connects the first to fourth common electrodes 206a-206d. The common electrode auxiliary line 206' does not generate an electric field for driving liquid crystal in the sub-pixels (P') but shields the first to fourth pixel electrodes 207a-207d from the influence of signals on the data line 203. The common electrode auxiliary line 206' can be disposed closer to the data line 203 than to the first to fourth pixel electrodes 207a-207d in order to more effectively shield against signals on the data line 203.

Still referring to FIG. 10A, a common electrode connection pattern 204 is formed to electrically connect neighboring common electrode auxiliary lines 206'. The common electrode connection pattern 204 can be formed anywhere on the common electrode auxiliary line 206'. The common electrode connection pattern 204 can be formed at a central portion of the common electrode auxiliary line 206' to increase the transfer speed of a signal to the common electrode module 206.

A pixel electrode auxiliary line 207' is formed parallel to the gate line 201 at an outer edge of the pixel (P). The pixel electrode auxiliary line 207' electrically connects the first to fourth pixel electrodes 207a-207d. An upper pixel electrode auxiliary line 207' is positioned at an upper end of the pixel electrodes 207a-207d. The upper pixel electrode auxiliary line 207' and an overlapped portion of the gate line 201 form a storage capacitor (Cst). A lower pixel electrode auxiliary line 207' is positioned at a lower end of the pixel electrodes 207a-207d. The lower pixel electrode auxiliary line 207' is electrically connected to the drain electrode 202b of the switching device 209.

The first to fourth common electrodes 206a-206d and the pixel electrode auxiliary line 207', or the first to fourth pixel electrodes 207a-207d and the common electrode auxiliary line 206', can form a different storage capacitor by overlapping with each other at a certain interval. A storage capacitor can be formed at a region where the common electrode module 206 and the pixel electrode module 207 cross and overlap each other. Accordingly, the capacitance of the storage capacitor can be increased.

Referring to FIG. 10B, the common electrode module 206 and the pixel electrode module 207 are electrically insulated by the gate insulation film 208 interposed therebetween. A passivation film 211 is formed on the entire surface of the substrate including the pixel electrode module 207.

A black matrix 221 and a color filter 223 are formed on the second substrate 220. The black matrix 221 prevents leakage of light from the liquid crystal display. The color filter 223 implements color for the liquid crystal display. First and second alignment films 212a and 212b are formed at facing surfaces of the first and second substrates 210 and 220. A liquid crystal layer 213 is interposed between the first and second alignment films 212a and 212b. The first and second alignment films 212a and 212b determine the initial alignment direction of the liquid crystal.

Referring to FIG. 10A, first and second protruded electrodes 206" and 207" are disposed facing each other within each sub-pixel (P'). The protruded electrodes 206" and 207" protrude from the first and second electrodes 206 and 207, respectively, toward an inner side of the sub-pixel P'. The first and second protruded electrodes 206" and 207" can protrude by any length but within a range such that the facing protruded electrodes do not contact each other.

Figure 11A:
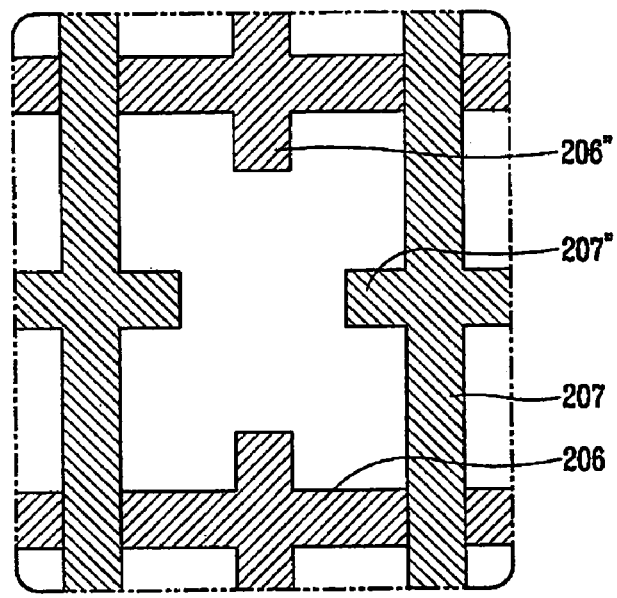
FIGS. 11A to 11C illustrate exemplary shapes for a protruded electrode.
Figure 11B:
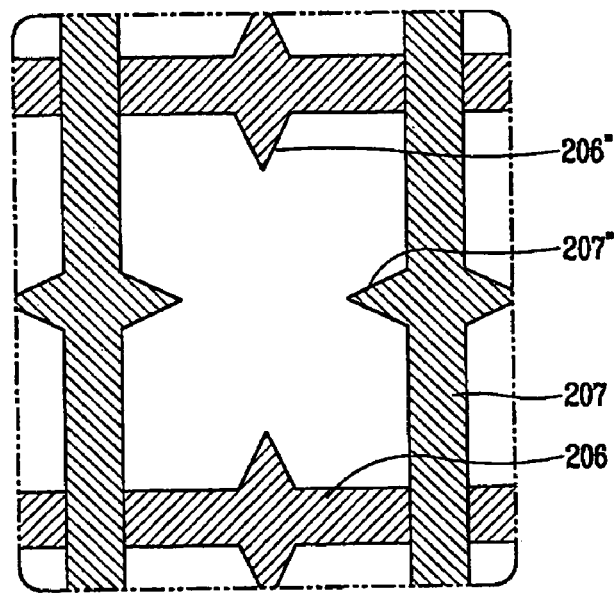
Figure 11C:
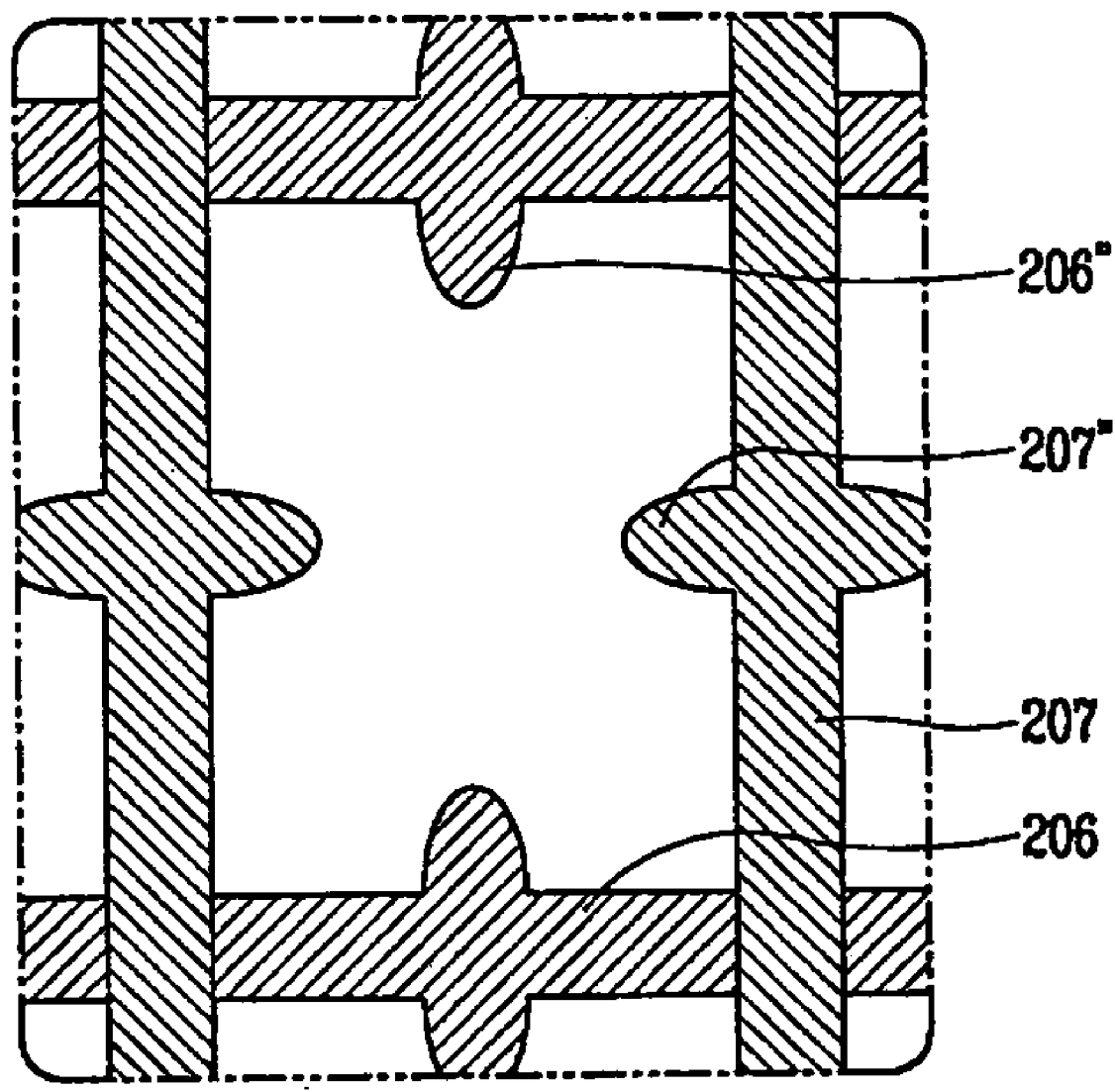

FIGS. 11A to 11C illustrate exemplary shapes for a protruded electrode. The first and second protruded electrodes 206" and 207" can be of any shape. For example, as shown in FIG. 11A, the first and second protruded electrodes 206" and 207" can have a rectangular shape. As shown in FIG. 11B, the first and second protruded electrodes 206" and 207" can have a triangular shape. As shown in FIG. 11C, the first and second protruded electrodes 206" and 207" can have a curved shape.

Figure 12A:
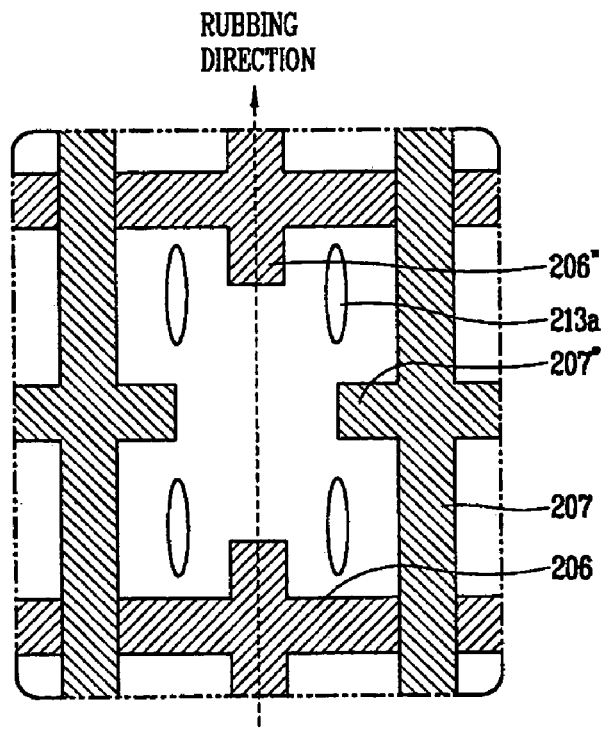
FIG. 12A illustrates the orientation of liquid crystal molecules when no voltage is applied to an exemplary in-plane switching mode liquid crystal display (LCD) device in accordance with an embodiment of the present invention.

In the in-plane switching model LCD device according to embodiments of the present invention, light transmittance is controlled by driving liquid crystal molecules in accordance with the strength of a voltage applied between the common electrode module 206 and the pixel electrode module 207. FIG. 12A illustrates the orientation of liquid crystal molecules when no voltage is applied to an exemplary in-plane switching mode liquid crystal display (LCD) device in accordance with an embodiment of the present invention. Referring to FIG. 12A, when no voltage is applied between the common electrode module 206 module and the pixel electrode module 207, the liquid crystal molecules 213a are disposed in the rubbing direction (the direction or arrow ↑) of the alignment film formed at the facing surfaces of the first and second substrates 210 and 220. As depicted in FIG. 12A, the rubbing direction of the alignment film is parallel to the direction of the pixel electrode module 207. In this case, liquid crystal molecules 213a are arranged parallel to the direction of the pixel electrode module 207, displaying black color on the screen. Alternatively, the rubbing direction can be parallel to the direction of the common electrode module 206. In this alternate case, liquid crystal molecules are arranged parallel to the direction of the common electrode module 206.

Figure 12B:
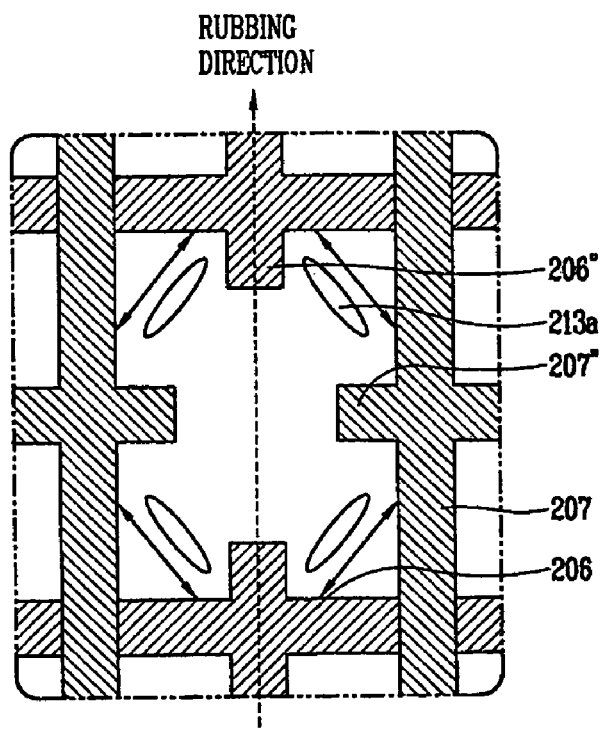
FIG. 12B illustrates the orientation of liquid crystal molecules when a voltage is applied to an exemplary in-plane switching mode liquid crystal display (LCD) device in accordance with an embodiment of the present invention.

FIG. 12B illustrates the orientation of liquid crystal molecules when a voltage is applied to an exemplary in-plane switching mode liquid crystal display (LCD) device in accordance with an embodiment of the present invention. Referring toe to FIG. 12B, an electric field is generated between the common electrode module 206 and the pixel electrode module 207 when a voltage is applied therebetween. The liquid crystal molecules 213a are driven by the generated electric field. The light transmittance capability of the liquid crystal molecules is a function of the applied voltage.

Figure 13:
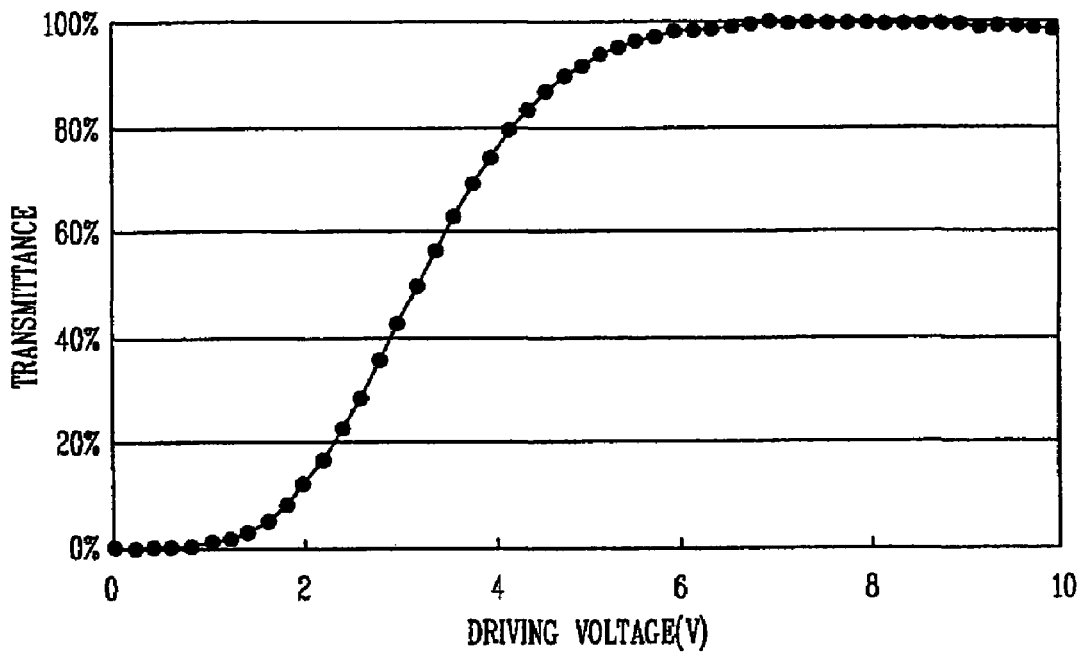
FIG. 13 is a graph showing variations of light transmittance characteristics of an exemplary in-plane switching mode LCD device in accordance with an embodiment of the present invention.

FIG. 13 is a graph showing variations of light transmittance characteristics of an exemplary in-plane switching mode LCD device in accordance with an embodiment of the present invention. As shown in FIG. 13, when no voltage is applied, light transmittance is 0. Light transmittance increases almost linearly with the strength of the applied voltage. When the voltage reaches a certain level, which corresponds to a maximum transmittance, light transmittance is not further increased even if the applied voltage is further increased. When the voltage increases further, the transmittance remains at the maximum value rather than decreasing. The initial voltage at which the maximum transmittance is reached is defined as Vmax.

The light transmittance characteristic curve depicted in FIG. 13 is due to the structural characteristics of the common electrode and the pixel electrode in accordance with embodiments of the present invention. Referring back to FIG. 12B, the common electrode module 206 and the pixel electrode module 207 cross each other perpendicularly to form the sub-pixel region. When a voltage is applied between the two electrodes modules 206 and 207, the electric field generated in the sub-pixel region is diagonally oriented at corner portions of the sub-pixel region is symmetrical about the center of the sub-pixel region. In addition, in accordance with embodiments of the present invention, a strong electric field can be generated to drive the liquid crystal molecules in a central portion of the sub-pixel region because of the protruded electrodes 206" and 207" in the sub-pixel region.

Figure 14:
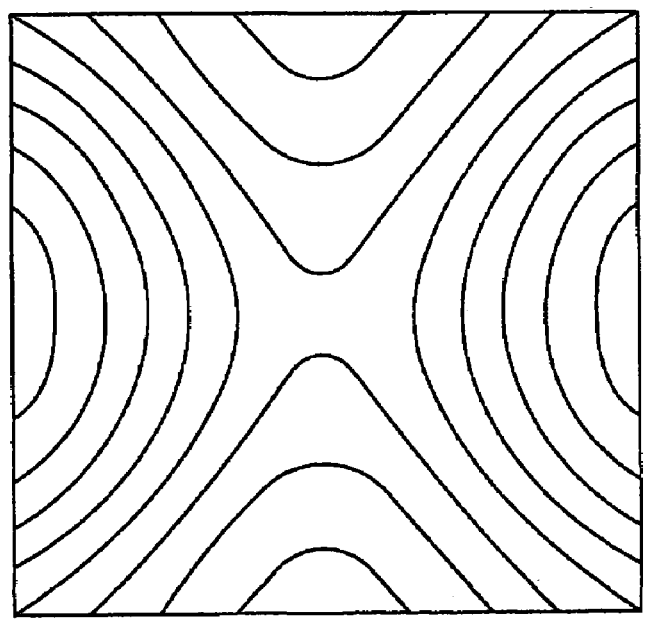
FIG. 14 shows an exemplary equipotential line in a sub-pixel region in accordance with an embodiment of the present invention.

FIG. 14 shows an exemplary equipotential line in a sub-pixel region in accordance with an embodiment of the present invention. Referring to FIG. 14, the equipotential line of this embodiment has a higher flux than the equipotential line of this embodiment, shown in FIG. 7. Moreover, the equipotential line of this embodiment is formed even at a central portion of the pixel. The generated electric field is stronger and more adequate for driving the liquid crystal molecules in a central portion. Thus, the degradation of luminance caused by abnormal driving of the liquid crystal molecules at a central portion of the sub-pixel region can be solved. Moreover, comparing FIGS. 7 and 14, since the flux of the equipotential line between the common electrode and the pixel electrode is even higher due to the protruded electrode, a response speed of the liquid crystal molecules can also be improved.

Figure 15A:
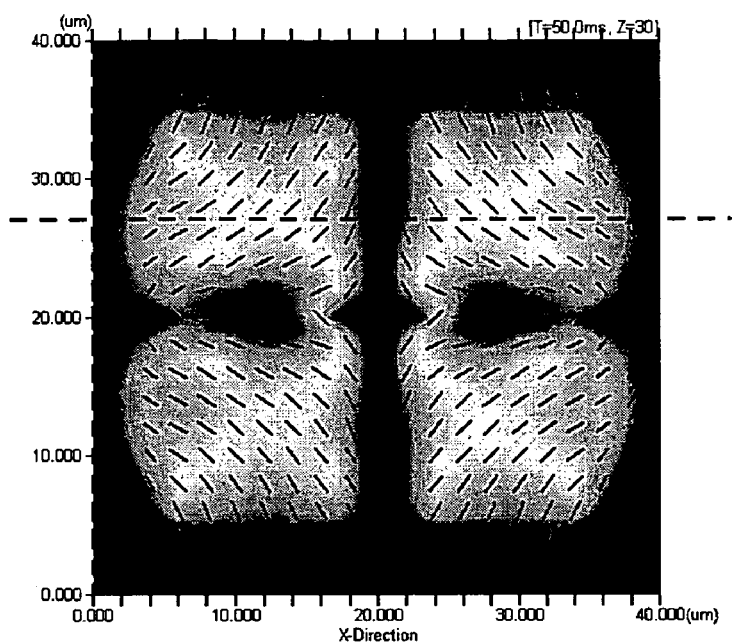
FIG. 15A is a planar view of orientations of liquid crystal molecules and front surface transmittance characteristics within a sub-pixel region in an exemplary in-plane switching mode LCD device in accordance with an embodiment of the present invention.
Figure 15B:
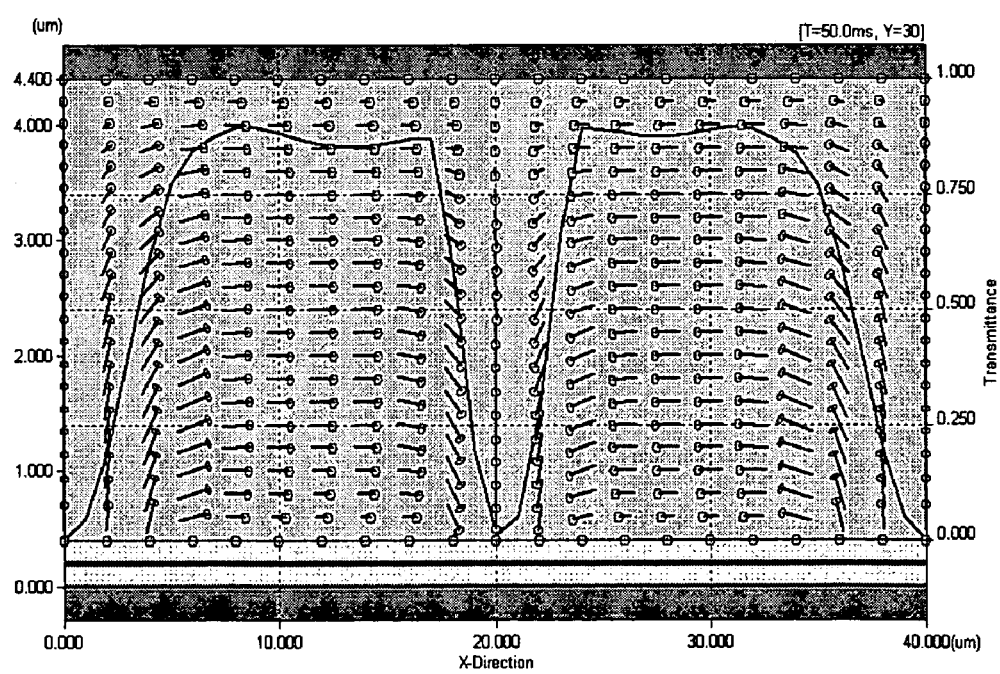
FIG. 15B is a cross-sectional view of the orientations of liquid crystal molecules and transmittance characteristics within a sub-pixel region in an exemplary in-plane switching mode LCD device in accordance with an embodiment of the present invention.

FIG. 15A is a planar view of orientations of liquid crystal molecules and front surface transmittance characteristics within a sub-pixel region in an exemplary in-plane switching mode LCD device in accordance with an embodiment of the present invention. FIG. 15B is a cross-sectional view of the orientations of liquid crystal molecules and transmittance characteristics within a sub-pixel region in an exemplary in-plane switching mode LCD device in accordance with an embodiment of the present invention. The cross-sectional view depicted in FIG. 15B is taken along line V-V of FIG. 15A.

As shown in FIGS. 15A and 15B, the light transmittance region is enlarged compared to the embodiment shown in FIGS. 10A and 10B because the region within each sub-pixel where liquid crystal molecules are driven is enlarged. The enlargement of the light transmittance region is caused by an increase in the strength of the generated electric field in the central portion of the sub-pixel. The increase in the strength of the generated electric field in the central portion of the sub-pixel region is caused by the first and second protruded electrodes which are respectively protruded from the common electrode and the pixel electrode. Accordingly, although a voltage similar to this embodiment is applied to the common electrode module and the pixel electrode module, the luminance of the LCD device can be enhanced. In particular, the luminance of a central portion of the sub-pixel region where the electric field direction is changed can be enhanced.

Figure 16A:
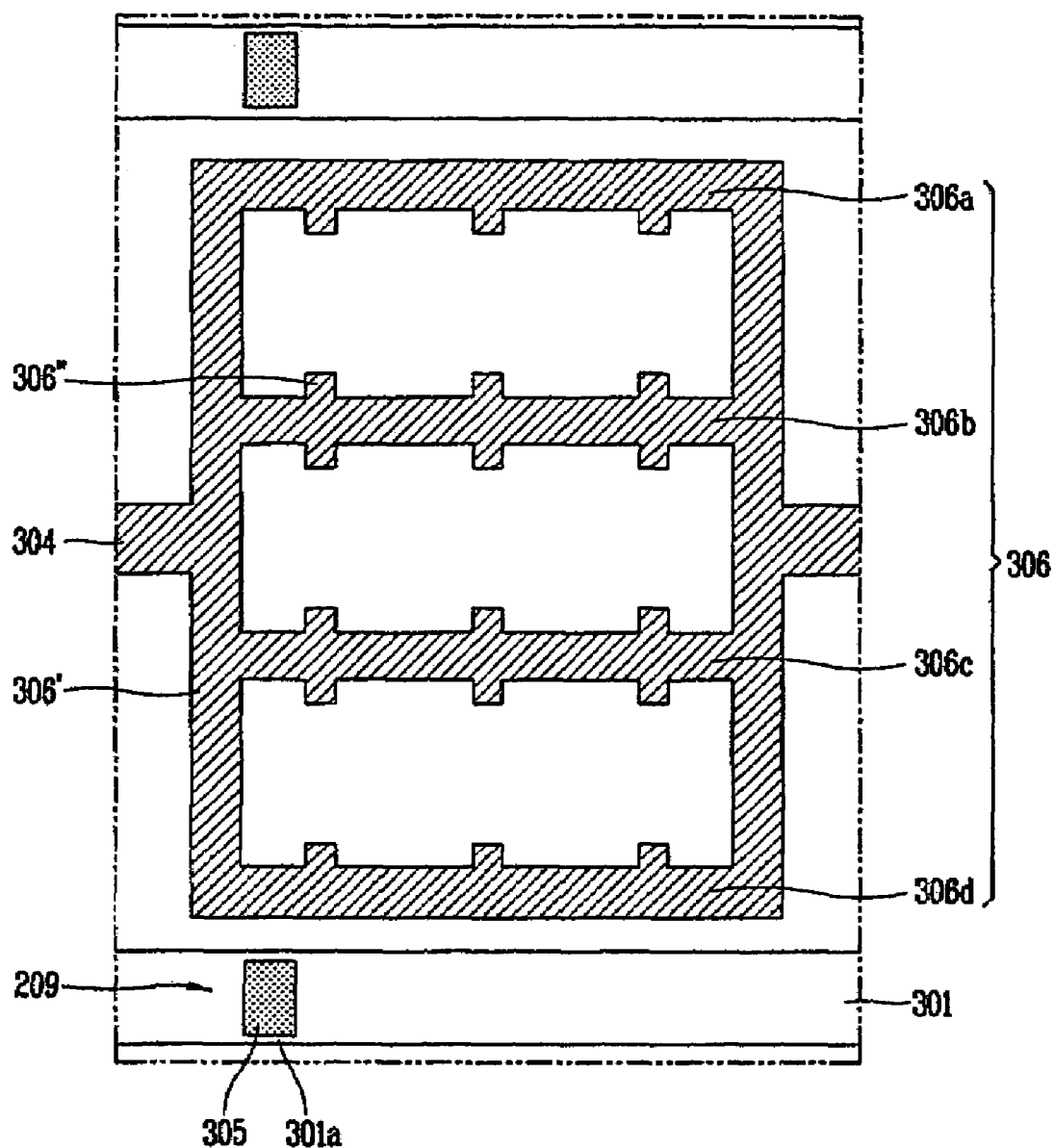
FIGS. 16A and 16B show a process of fabricating an in-plane LCD device in accordance with an embodiment of the present invention.
Figure 16B:
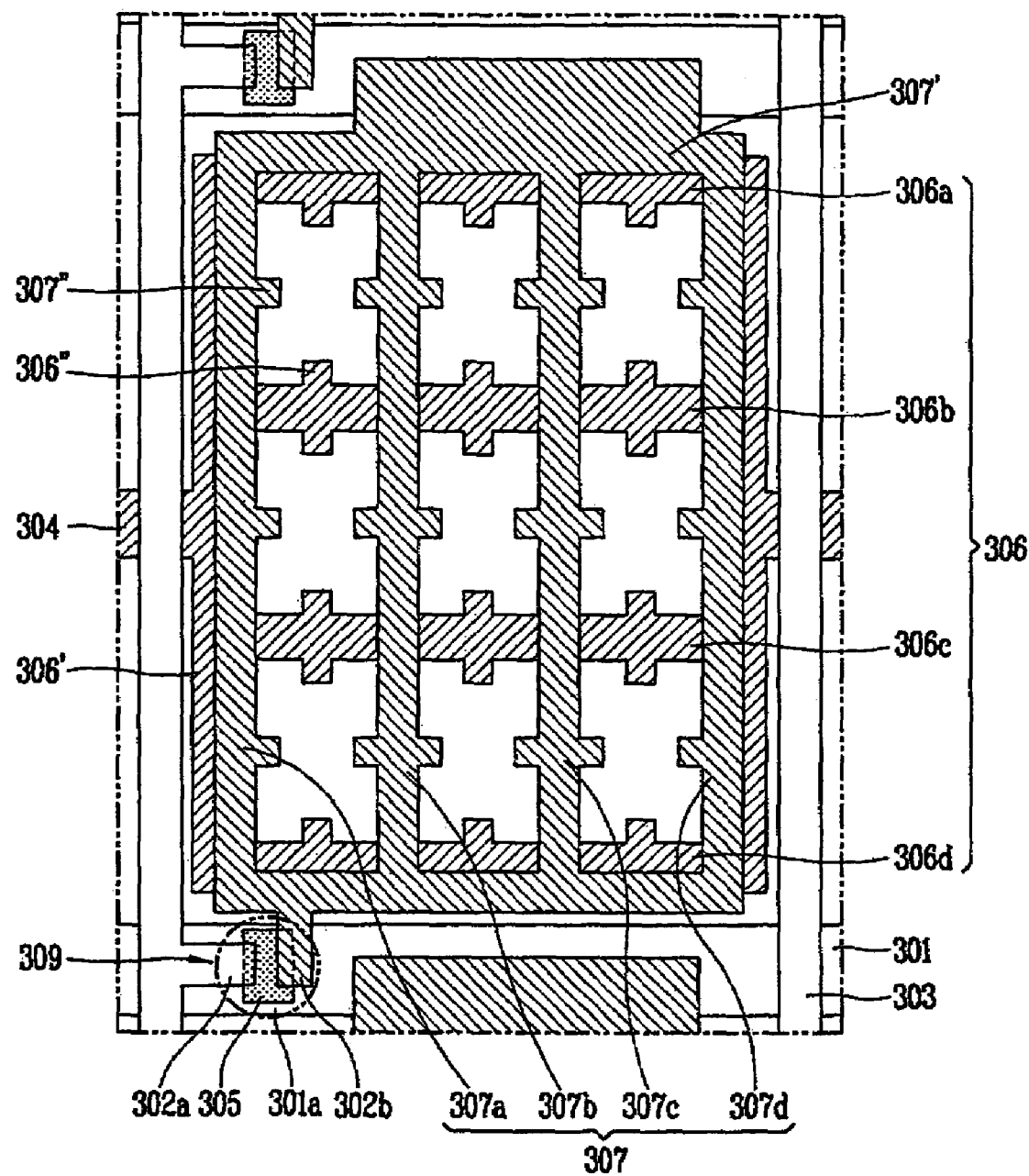

FIGS. 16A and 16B show a process of fabricating an in-plane LCD device in accordance with an embodiment of the present invention. As shown in FIG. 16A, a transparent insulation substrate 310, such as glass, is prepared. A metal, such as Cu, Ti, Cr, Al, Mo, Ta or Al, or the like, is deposited on the transparent substrate 310 through a sputtering method, for example. Then, the deposited metal is patterned to form a gate line 301 including a gate electrode 301a, a plurality of common electrodes 306a-306d, a common electrode auxiliary line 306', and a common electrode pattern 304. The plurality of common electrodes 306a-306d are disposed parallel to the gate line 301. The common electrode auxiliary line 306' is vertically disposed at both ends of the common electrodes 306a-306d and electrically connects the common electrodes 306a-306d. The common electrode pattern 304 electrically connects common electrodes of neighboring pixels (not shown) through the common electrode auxiliary line 306'. The common electrodes 306a-306d can be formed with a transparent conductive material, such as ITO (Indium Tin Oxide), or IZO (Indium Zinc Oxide). The common electrodes 306a-306d can be formed through a separate process.

Subsequently, an inorganic substance, such as SiNx or SiOx, is deposited on the entire surface of the substrate, including the gate line 301 and the common electrodes 306a-306d, through a plasma CVD enhanced method, for example, to form a gate insulation film (not shown). An amorphous silicon layer and n+ amorphous silicon layer are stacked at an upper portion of the gate insulation film (not shown), and then patterned to form a semiconductor layer 305 at an upper portion of the gate electrode 301a.

Thereafter, as shown in FIG. 16B, a metal, such as a Cu, Mo, Ta, Al, Cr, Ti or Al alloy, or the like, is deposited through a sputtering method, for example, and then patterned. A data line 303 is formed vertically crossing the gate line 301 to define a pixel. Source electrode/drain electrode 302a and 302b are positioned on the semiconductor layer 305. A plurality of pixel electrodes 307a-307d are disposed parallel to the data line 303 and vertically crossing the common electrodes 306a-306d to form a plurality of sub-pixels (P') together with the plurality of common electrodes 306a-306d. A pixel electrode auxiliary line 307' is disposed at both ends of the pixel electrodes 307a-307d to electrically connect the pixel electrodes 307. The pixel electrode auxiliary line 307' positioned at an upper end of the pixel overlaps a front end of the gate line 301. The pixel electrode auxiliary line 307' positioned at a lower end is electrically connected to the drain electrode 302b. The pixel electrodes 307a-307d can be formed with a transparent conductive material, such as ITO (Indium Tin Oxide), or IZO (Indium Zinc Oxide). The common electrodes 307a-307d can be formed through a separate process.

Through the above-described process, a thin film transistor 309 is formed to include the gate electrode 301, the semiconductor layer 305 and the source/drain electrodes 302a/302b. The thin film transistor 309 is formed on the gate line 301 at a crossing of the gate line 301 and the data line 303. Then, an inorganic material, such as SiNx, SiOx, or the like, or an organic material, such as benzocyclobutene, acryl, or the like, is formed on the entire surface of the substrate including the thin film transistor 309 and the pixel electrode module 307, to form a passivation film (not shown). Although not shown, a second substrate with a black matrix and a color filter formed thereon is prepared. The first substrate fabricated through the above-described process is attached to the second substrate, thereby completing the fabrication of an in-plane switching mode LCD device.

The in-plane switching mode liquid crystal display device in accordance with embodiments of the present invention provides many advantages. For example, the maximum luminance can be sustained even at higher levels of applied voltage Vmax. In embodiments of the present invention, the maximum applied voltage Vmax can be set higher than a theoretical value, while maintaining the maximum luminance. In addition, the color shift phenomenon can be minimized by forming sub-pixels having four domains per pixel by suitable horizontal and vertical arrangements of the common electrode and the pixel electrode. Thus, the image quality can be improved in accordance with the reduction in the color shift. Moreover, the light transmitting region in a central portion of the sub-pixel can be increased, thus enhancing the luminance and response speed of liquid crystal molecules, because of the first of second protruded electrodes protruding from the common electrodes and the pixel electrodes. Moreover, an aperture ratio can be enhanced by forming the common electrode and the pixel electrode with a transparent conductive material.

It will be apparent to those skilled in the art that various modifications and variations can be made in the in-plane switching mode liquid crystal display device and fabrication thereof of the present invention without departing from the spirit or scope of the invention. Thus, it is intended that the present invention cover the modifications and variations of this invention provided they come within the scope of the appended claims and their equivalents.

What is claimed is:
1. An in-plane switching mode LCD device comprising:
a first substrate;
one or more gate lines arranged in a first direction on the first substrate;
one or more data lines arranged in a second direction perpendicular to the first direction on the first substrate, a crossing of the one or more data lines with the one or more gate lines defining a pixel region;
a plurality of common electrodes disposed in the pixel region;
a plurality of pixel electrodes overlapping the common electrodes to define a plurality of sub-pixels;
a second substrate facing the first substrate;
a first alignment film and a second alignment film disposed at facing surfaces of the first and second substrates, respectively; and
a liquid crystal layer between the first alignment film and the second alignment film, wherein a common electrode module includes a plurality of common electrodes arranged parallel to the one or more gate lines, a plurality of protruded common electrodes protruding from one or more of the plurality of common electrodes,
a left common electrode auxiliary line disposed at an outer left edge of the pixel region and a right common electrode auxiliary line disposed at an outer right edge of the pixel region, the left and the right common electrode auxiliary lines connecting the plurality of common electrodes,
wherein the common electrode auxiliary line does not generate an electric field for driving liquid crystal in the sub-pixel regions;
a common electrode connection pattern electrically connecting the common electrode module to an adjacent common electrode module,
wherein the common electrode connection pattern is disposed at a central portion of one of the left common electrode auxiliary line and the right common electrode auxiliary line, and
wherein the pixel electrode module includes a plurality of pixel electrodes arranged parallel to the one or more data line and a plurality of protruded pixel electrodes protruding from one or more of the plurality of pixel electrodes.

2. The device of claim 1, wherein the common electrode module further includes a second plurality of protruded common electrodes protruding from one or more of the left common electrode auxiliary line and the right common electrode auxiliary line.

3. The device of claim 1, wherein one of the left common electrode auxiliary line and the right common electrode auxiliary line is disposed closer to the one or more data line than to the plurality of pixel electrodes, thereby shielding the plurality of pixel electrodes from a signal on the one or more data line.

4. The device of claim 1, wherein the left common electrode auxiliary line and the right common electrode auxiliary line are parallel to the one or more data line.

5. The device of claim 1, wherein the pixel electrode module includes an upper pixel electrode auxiliary line disposed at an upper end of the pixel region and connecting the pixel electrodes, the plurality of pixel electrodes crossing the plurality of common electrodes to define a plurality of sub-pixel regions.

6. The device of claim 5, wherein the pixel electrode module includes a second plurality of protruded pixel electrodes protruding from the upper pixel electrode auxiliary line.

7. The device of claim 5, further comprising a lower pixel electrode auxiliary line disposed at a lower end of the pixel region and connecting the plurality of pixel electrodes.

8. The device of claim 7, further comprising a first storage capacitor including one of the upper pixel electrode auxiliary line and the lower pixel electrode auxiliary line, and an overlapped portion of the gate line.

9. The device of claim 7, further comprising a second storage capacitor including one of the upper pixel electrode auxiliary line and the lower pixel electrode auxiliary line, and an overlapped portion of one of the plurality of common electrodes.

10. The device of claim 1, further comprising a third storage capacitor including one of the left common electrode auxiliary line and the right common electrode auxiliary line, and an overlapped portion of one of the plurality of pixel electrodes.

11. The device of claim 1, further comprising a fourth storage capacitor formed at a region where the pixel electrode module overlaps the common electrode module.

12. The device of claim 1, wherein the pixel electrode module includes an upper pixel electrode auxiliary line disposed at an upper end of the pixel region and connecting the pixel electrodes, the plurality of pixel electrodes crossing the plurality of common electrodes to define a plurality of sub-pixel regions.

13. The device of claim 12, wherein the pixel electrode module includes a second plurality of protruded pixel electrodes protruding from the upper pixel electrode auxiliary line.

14. The device of claim 12, further comprising a lower pixel electrode auxiliary line disposed at a lower end of the pixel region and connecting the plurality of pixel electrodes.

15. The device of claim 1, further comprising:
a switching device at a crossing of the one or more gate line and the one or more data line.

16. The device of claim 15, wherein the switching device includes:
a gate electrode connected to the one or more gate line;
a gate insulation film on the gate electrode;
a semiconductor layer on the gate insulation film; and
a source and a drain electrodes on the semiconductor layer.

17. The device of claim 1, wherein the second substrate includes a color filter and a black matrix.

18. The device of claim 1, wherein the first alignment film has a rubbing direction that is the same as the direction of the one or more gate line.

19. The device of claim 1, wherein the first alignment film has a rubbing direction that is the same as the direction of the one or more data line.

20. The device of claim 1, wherein at least one of the protruded common electrodes and the protruded pixel electrodes has a rectangular shape.

21. The device of claim 1, wherein at least one of the protruded common electrodes and the protruded pixel electrodes has a triangular shape.

22. The device of claim 1, wherein at least one of the protruded common electrodes and the protruded pixel electrodes has a curved shape.

23. An in-plane switching mode LCD device comprising:
a first substrate;
one or more gate line arranged in a first direction on the first substrate;
one or more data line arranged in a second direction perpendicular to the first direction on the first substrate, a crossing of the one or more data line with the one or more gate line defining a pixel region;
a plurality of common electrodes disposed in the pixel region;
a plurality of pixel electrodes overlapping the common electrodes to define a plurality of sub-pixels;
a plurality of first protruded electrodes protruding from one or more of the plurality of common electrodes;
a plurality of second protruded electrodes protruding from one or more of the plurality of pixel electrodes;
a left common electrode auxiliary line disposed at an outer left edge of the pixel region and a right common electrode auxiliary line disposed at an outer right edge of the pixel region, the left and the right common electrode auxiliary lines connecting the plurality of common electrodes,
wherein the common electrode auxiliary line does not generate an electric field for driving liquid crystal in the sub-pixel regions;
a common electrode connection pattern electrically connecting the common electrode to an adjacent common electrode,
wherein the common electrode connection pattern is disposed at a central portion of one of the left common electrode auxiliary line and the right common electrode auxiliary line;
a second substrate facing the first substrate;
a first alignment film and a second alignment film disposed at facing surfaces of the first and second substrates, respectively; and
a liquid crystal layer between the first alignment film and the second alignment film.

24. A method for fabricating an in-plane switching mode LCD device comprising:
providing a first substrate and a second substrate facing each other;
forming one or more horizontal gate line on the first substrate; forming one or more vertical data line on the first substrate, a crossing of the one or more data line with the one or more gate line defining a pixel region;
forming a plurality of common electrodes in the pixel region, parallel to the one or more gate line;
forming a plurality of pixel electrodes in the pixel region and parallel to the one or more data line, the plurality of pixel electrodes overlapping and crossing the plurality of common electrodes to define a plurality of sub-pixel regions;
forming a plurality of first protruded electrodes protruding from one or more of the plurality of common electrodes;
forming a plurality of second protruded electrodes protruding from one or more of the plurality of pixel electrodes;
forming a left common electrode auxiliary line disposed at an outer left edge of the pixel region and a right common electrode auxiliary line disposed at an outer right edge of the pixel region, the left and the right common electrode auxiliary lines connecting the plurality of common electrodes, wherein left and the right common electrode auxiliary lines do not generate an electric field for driving liquid crystal in the sub-pixel regions;
forming a common electrode connection pattern electrically connecting the common electrode to an adjacent common electrode, wherein the common electrode connection pattern is disposed at a central portion of one of the left common electrode auxiliary line and the right common electrode auxiliary lines;
forming a first alignment film and a second alignment film at facing surfaces of the first and second substrates, respectively; and forming a liquid crystal layer between the first alignment film and the second alignment film.

25. The method of claim 22, further comprising:

forming an insulation film between the plurality of common electrodes and the plurality of pixel electrodes.

26. The method of claim 23, further comprising:

forming a color filter and a black matrix on the second substrate.

* * * * *